Patented Sept. 7, 1943

2,328,959

UNITED STATES PATENT OFFICE 2,328,959

TRIAZINE DERIVATIVES

Gaetano F. D'Alelio and James W. Underwood, Pittsfield, Mass., assignors to General Electric Company, a corporation of New York No Drawing. Application August 26, 1942, Serial No. 456,264

16 Claims. (Cl. 260—249.5)

This invention relates to new chemical compounds and more particularly to triazine derivatives. The invention especially is concerned with the production of new and useful esters of bis-(triazinyl thio) monocarboxylic aliphatic acids.

The chemical compounds of this invention may be represented by the following general formula:

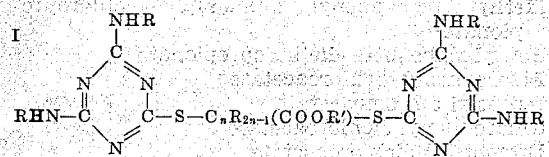

In the above formula $n$ represents an integer and is at least 1 and not more than 2, R represents a member of the class consisting of hydrogen and monovalent hydrocarbon and substituted hydrocarbon radicals, more particularly halohydrocarbon radicals, and R' represents a member of the class consisting of monovalent aliphatic hydrocarbon radicals and monovalent aromatic and nuclearly substituted, specifically nuclearly halogenated, aromatic hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogen-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I is hydrogen. However, there also may be produced in accordance with the present invention compounds such, for instance, as those represented by the general formula:

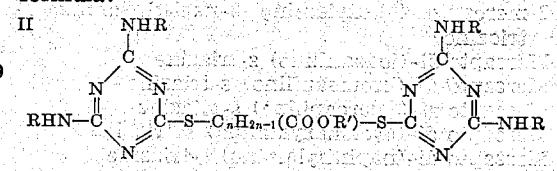

where $n$, R and R' have the same meanings as given above with reference to Formula I.

The new compounds of this invention may be used, for example, as pharmaceuticals, plasticizers, fungicides, insecticides and as intermediates in the preparation of derivatives thereof, e. g., hydrazino, carbazido, semicarbazido, ureido, amidine, methylol, methylene, etc., derivatives of the individual compound embraced by Formula I. Our new compounds are especially valuable in the preparation of synthetic resinous compositions. Thus, they may be condensed with, for instance, aldehydes, including polymeric aldehydes, hydroxyaldehydes and aldehyde-addition products, to yield condensation products having particular utility in the plastics and coating arts. Such condensation products are more fully described and are specifically claimed in our copending application Serial No. 458,725, filed September 17, 1942, as a continuation-in-part of the present application and assigned to the same assignee as the present invention. These new triazine derivatives also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between (1) a mercapto triazine corresponding to the general formula III 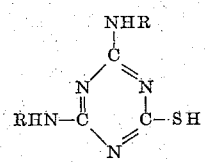

and (2) an ester of a dihalogenated aliphatic monocarboxylic acid corresponding to the general formula IV $\qquad X_2C_nR_{2n-1}COOR'$ where X represents a halogen atom and $n$, R and R' have the same meanings as given above with reference to Formula I, the reactants being employed in the ratio of at least two mols of the mercapto triazine of (1) per mole of the ester of (2).

Illustrative examples of mercapto triazines that may be used, depending upon the particular end-product desired, are:

Mercapto diamino s-triazine (2-mercapto 4,6-diamino s-triazine, 4-mercapto 2,6-diamino s-triazine or 6-mercapto 2,4-diamino s-triazine)
Mercapto di-(methylamino) s-triazine
Mercapto dianilino s-triazine [mercapto di-(phenylamino) s-triazine]
2-mercapto 4-amino 6-ethylamino s-triazine
Mercapto di-(propylamino) s-triazine
Mercapto di-(allylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-hexylamino 6-naphthylamino s-triazine
Mercapto di-(iodoanilino) s-triazine
Mercapto di-(bromoanilino) s-triazine
Mercapto di-(fluoroanilino) s-triazine
Mercapto di-(cyclohexylamino) s-triazine
Mercapto di-(naphthylamino) s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-isopropylanilino 6-phenylpropylamino s-triazine
2-mercapto 4-dichloroanilino 6-chloroethylamino s-triazine
Mercapto di-(octylamino) s-triazine
Mercapto di-(xenylamino) s-triazine
2-mercapto 4-amino 6-bromoethylamino s-triazine
2-mercapto 4-amino 6-methylamino s-triazine
Mercapto di-(phenethylamino) s-triazine
2-mercapto 4-amino 6-benzylamino s-triazine
Mercapto di-(benzylamino) s-triazine
Mercapto di-(chlorobutylamino) s-triazine
Mercapto di-(hexylamino) s-triazine Illustrative examples of esters of dihalogeno aliphatic monocarboxylic acids that may be used, depending upon the particular end-product desired, are:

The aliphatic and aromatic dihalogenoacetates and dihalogenopropionates
The nuclearly halogenated aromatic dihalogenoacetates and dihalogenopropionates More specific examples are:

Methyl dichloroacetate
Methyl dibromoacetate
Ethyl dichloroacetate
Ethyl dibromoacetate
Methyl diiodoacetate
Ethyl diiodoacetate
Propyl dichloroacetate
Propyl dibromoacetate
Isobutyl dichloroacetate
Propenyl dichloroacetate
Cyclopentyl dichloroacetate
Phenyl dichloroacetate
Benzyl dichloroacetate
Ethylphenyl dichloroacetate
Methyl alpha,beta-dichloropropionate
Ethyl alpha,beta-dichloropropionate
Propyl alpha,beta-dichloropropionate
Allyl alpha-beta-dichloropropionate
Phenyl alpha,beta-dibromopropionate
Methyl alpha-alpha-dichloropropionate
Phenyl alpha,alpha-dibromopropionate
Methyl beta,beta-dichloropropionate
Ethyl beta,beta-diiodopropionate
Tolyl beta,beta-dichloropropionate
Methyl alpha-methyl alpha,beta-dichloropropionate
Phenyl alpha-ethyl beta,beta-dichloropropionate
Methyl beta-phenyl alpha,alpha-dichloropropionate
Benzyl alpha-beta-dichloropropionate
Fluorophenyl dichloroacetate
Iodotolyl dibromoacetate
Chlorophenyl dichloroacetate
Bromotolyl dichloroacetate
Hexyl alpha,beta-dichloropropionate
Pentyl alpha,alpha-dichloropropionate
Xenyl beta,beta-dibromopropionate
Methyl alpha-chlorophenyl alpha,beta-dichloropropionate
Phenyl alpha-chlorotolyl alpha,beta-dichloropropionate Various hydrohalide acceptors may be employed. We prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino [(—NHR)$_2$] triazine and the chosen ester of a dihalogeno aliphatic monocarboxylic acid may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. Instead of alcohol, other solvents may be employed, for instance dioxane. The reaction may be carried out under a variety of temperature and pressure conditions, for example at normal, sub-normal or at elevated temperatures and at atmospheric, sub-atmospheric or super-atmospheric pressures. From the standpoint of convenience and economy, normal or elevated temperature conditions and atmospheric pressure usually are most desirable.

The above reaction may be represented by the following general equation:

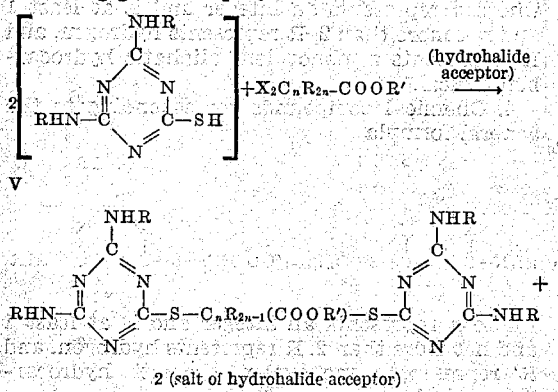

In the above equation X represents a halogen atom, and $n$, R and R' have the same meanings as given above with reference to Formula I.

In order that those skilled in the art better may understand how the present invention may be carried into effect, the following examples are given by way of illustration and not by way of limitation. All parts are by weight.

Example 1

This example illustrates the preparation of methyl alpha,beta-bis-(diamino s-triazinyl thio) propionate.

| | Parts | Approximate mol ratio |
|---|---|---|
| Mercapto diamino s-triazine | 143.0 | 2 |
| Methyl alpha,beta-dichloropropionate | 78.5 | 1 |
| Sodium hydroxide | 40.0 | 2 |
| Water | 500.0 | |
| Alcohol | 500.0 | |

All of the above ingredients with the exception of the methyl alpha,beta-dichloropropionate were mixed together, yielding a clear solution. The ester was then added and the mass was allowed to stand at room temperature for 5 days, followed by heating under reflux at the boiling temperature of the mass for 1 hour. After cooling, the precipitated product comprising methyl alpha,beta-bis-(diamino s-triazinyl thio) propionate was filtered off, washed well with water to remove soluble salts and dried. No attempt was made to obtain any more product from the mother liquor. A yield of 152 parts of the purified, dried compound was obtained.

Example 2

Ethyl bis-(diamino s-triazinyl thio) acetate is prepared in essentially the same manner as described under Example 1 with the exception that 78.5 parts of ethyl dichloroacetate are used in place of 78.5 parts of methyl alpha,beta-dichloropropionate.

Example 3

Propyl alpha,beta-bis-(diamino s-triazinyl thio) butyrate is prepared in essentially the same manner as described under Example 1 with the exception that 144 parts of propyl alpha,beta-dibromobutyrate are used instead of 78.5 parts of methyl alpha,beta-dichloropropionate.

Example 4

Methyl alpha,beta-bis-[di-(methylamino) s-triazinyl thio] propionate is prepared in essentially the same manner as described under Example 1 with the exception that 171 parts of mercapto di-(methylamino) s-triazine are used in place of 143 parts of mercapto diamino s-triazine.

Example 5

Phenyl bis-(diamino s-triazinyl thio) acetate is prepared in essentially the same manner as described under Example 1 with the exception that 102.5 parts of phenyl dichloroacetate are used in place of 78.5 parts of methyl alpha,beta-dichloropropionate.

Illustrative examples of other compounds embraced by Formula I that may be produced in accordance with the present invention are listed below, including examples of aliphatic (e. g., alkyl, alkenyl), aromatic and nuclearly halogenated aromatic esters of bis-(triazinyl thio) acetic and propionic acids:

Methyl bis-(diamino s-triazinyl thio) acetate, which also may be named methyl bis-(2,4-diamino s-triazinyl-6 thio) acetate, methyl bis-(2,6-diamino s-triazinyl-4 thio) acetate or methyl bis-(4,6-diamino s-triazinyl-2 thio) acetate.
Isobutyl bis-(diamino s-triazinyl thio) acetate
Propenyl bis-(diamino s-triazinyl thio) acetate
Phenyl bis-[di-(methylamino) s-triazinyl thio] acetate
Tolyl bis-(diamino s-triazinyl thio) acetate
Ethyl alpha,beta-bis-(diamino s-triazinyl thio) propionate
Phenyl alpha,beta-bis-(diamino s-triazinyl thio) propionate
Methyl bis-[di-(methylamino) s-triazinyl thio] acetate
Ethyl bis-[di-(ethylamino) s-triazinyl thio] acetate
Phenyl bis-[di-(isobutylamino) s-triazinyl thio] acetate
Fluorophenyl bis-[di-(cyclopentylamino) s-triazinyl thio] acetate
Tolyl bis-[di-(propenylamino) s-triazinyl thio] acetate
Methyl alpha,beta-bis-(dianilino s-triazinyl thio) propionate
Ethyl alpha-ethyl alpha,beta-bis-(ditoluido s-triazinyl thio) propionate
Phenyl alpha-phenyl beta,beta-bis-(diamino s-triazinyl thio) propionate
Propyl alpha-(chlorophenyl) beta,beta-bis-(diamino s-triazinyl thio) propionate
Xenyl alpha-ethyl beta,beta-bis-(diamino s-triazinyl thio) propionate
Pentyl beta-methyl alpha,beta-bis-(diamino s-triazinyl thio) propionate
Tolyl beta-propyl alpha,beta-bis-(diamino s-triazinyl thio) propionate
Methyl alpha,beta-bis-(4-methylamino 6-amino s-triazinyl-2 thio) propionate
Ethyl alpha,alpha-bis-(4-anilino 6-amino s-triazinyl-2 thio) propionate
Chlorophenyl bis-(diamino s-triazinyl thio) acetate
Chloronaphthyl bis-(diamino s-triazinyl thio) acetate
Methyl bis-(ditoluido s-triazinyl thio) acetate
Methyl bis-[di-(iodoanilino) s-triazinyl thio] acetate Methyl bis-[di-(chloroethylamino) s-triazinyl thio] acetate
Propyl bis-(diamino s-triazinyl thio) acetate
Xylyl bis-(diamino s-triazinyl thio) acetate
Xenyl bis-(diamino s-triazinyl thio) acetate
Naphthyl bis-(diamino s-triazinyl thio) acetate
Allyl bis-(diamino s-triazinyl thio) acetate
Bromophenyl bis-(diamino s-triazinyl thio) acetate
Hexyl alpha,beta-bis-[di-(allylamino) s-triazinyl thio] propionate
Cyclohexyl alpha,beta-bis-[di-(cyclohexylamino) s-triazinyl thio] propionate
Methyl bis-[di-(cyclohexenylamino) s-triazinyl thio] acetate
Benzyl bis-(diamino s-triazinyl thio) acetate
Phenethyl bis-(diamino s-triazinyl thio) acetate
Ethylphenyl bis-(diamino s-triazinyl thio) acetate
Tolyl alpha,beta-bis-(dianilino s-triazinyl thio) propionate
Methyl bis-(4-naphthylamino 6-ethylamino s-triazinyl-2 thio) acetate
Phenyl alpha,beta-bis-[di-(naphthylamino) s-triazinyl thio] propionate
Iodophenyl bis-(diamino s-triazinyl thio) acetate
Allyl alpha,beta-bis-(diamino s-triazinyl thio) propionate
Methallyl bis-(diamino s-triazinyl thio) acetate
Tetradecyl bis-(diamino s-triazinyl thio) acetate
Octyl bis(diamino s-triazinyl thio) acetate
Hexyl alpha,alpha-bis-(diamino s-triazinyl thio) propionate
Heptyl beta,beta-bis-(diamino s-triazinyl thio) propionate In a manner similar to that described above with particular reference to the esters of bis-(symmetrical-triazinyl thio) monocarboxylic acids, corresponding derivatives of the asymmetrical triazines and of the vicinal triazines may be prepared.

What we claim as new and desire to secure by Letters Patent of the United States is:

1. Chemical compounds corresponding to the general formula

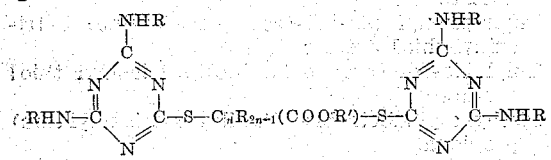

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. Chemical compounds corresponding to the general formula

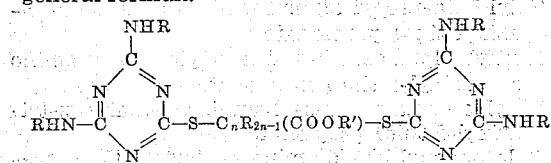

where $n$ represents an integer and is at least 1 and not more than 2, R represents hydrogen, and R' represents a member of the class consisting of monovalent aliphatic hydrocarbon radicals and monovalent aromatic and nuclearly halogenated aromatic hydrocarbon radicals.

3. Chemical compounds corresponding to the general formula

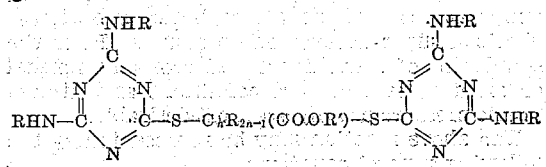

where $n$ represents an integer and is at least 1 and not more than 2, R represents hydrogen, and R' represents a monovalent aliphatic hydrocarbon radical.

4. Chemical compounds corresponding to the general formula

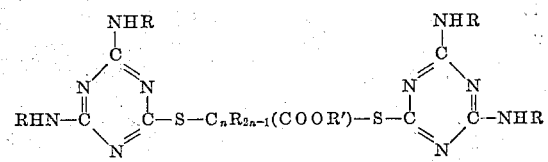

where $n$ represents an integer and is at least 1 and not more than 2, R represents hydrogen, and R' represents a monovalent aromatic hydrocarbon radical.

5. Chemical compounds corresponding to the general formula

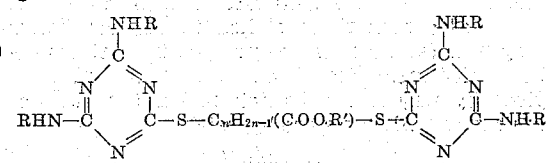

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

6. An aliphatic ester of bis-(diamino s-triazinyl thio) acetic acid.

7. An alkyl ester of bis-(diamino s-triazinyl thio) acetic acid.

8. An aliphatic ester of bis-(diamino s-triazinyl thio) propionic acid.

9. An alkyl ester of bis-(diamino s-triazinyl thio) propionic acid.

10. An aromatic ester of bis-(diamino s-triazinyl thio) acetic acid.

11. Phenyl bis-(diamino s-triazinyl thio) acetate.

12. Ethyl bis-(diamino s-triazinyl thio) acetate.

13. Methyl alpha,beta-bis-(diamino s-triazinyl thio) propionate.

14. The method of preparing chemical compounds corresponding to the general formula

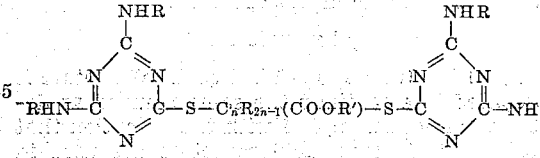

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals, said method comprising effecting reaction, in the presence of a hydrohalide acceptor, between (1) a mercapto triazine corresponding to the general formula

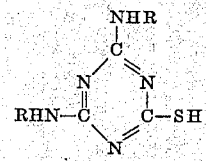

where R has the meaning above given, and (2) an ester of a dihalogenated monocarboxylic aliphatic acid corresponding to the general formula

$X_2C_nR_{2n-1}COOR'$ where X represents a halogen atom, and $n$, R and R' have the same meanings as given above, the said reactants being employed in the ratio of at least two mols of the mercapto triazine of (1) per mol of the ester of (2).

15. The method of preparing chemical compounds corresponding to the general formula

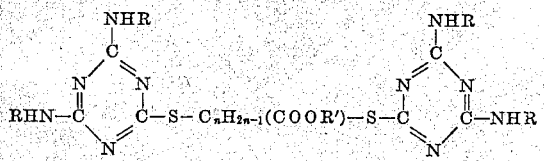

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals, said method comprising effecting reaction, in the presence of an alkali-metal hydroxide, between (1) a mercapto triazine corresponding to the general formula

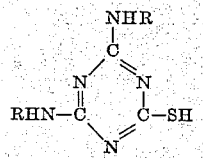

where R has the meaning above given, and (2) an ester of a dihalogenated monocarboxylic aliphatic acid corresponding to the general formula

$X_2C_nH_{2n-1}COOR'$ where X represents a chlorine atom, and $n$ and R' have the same meanings as given above, the said reactants being employed in the ratio of at least two mols of the mercapto triazine of (1) per mol of the ester of (2).

16. The method of preparing methyl alpha,beta-bis-(diamino s-triazinyl thio) propionate which comprises effecting reaction, in the presence of an alkali-metal hydroxide, between methyl alpha,beta-dichloropropionate and mercapto diamino s-triazine in the ratio of one mol of the former to at least two mols of the latter.

GAETANO F. D'ALELIO.
JAMES W. UNDERWOOD.

Certificate of Correction

Patent No. 2,328,959. September 7, 1943.

GAETANO F. D'ALELIO, ET AL.

It is hereby certified that errors appear in the printed specification of the above numbered patent requiring correction as follows: Page 2, first column, line 21, for "mole" read *mol*; and second column, line 24, for "alpha-beta-" read *alpha,beta-*; line 26, for "alpha-alpha-" read *alpha,alpha-*; and second column, line 36, for "alpha-beta-" read *alpha,beta-*; page 3, first column, line 10-15, for read

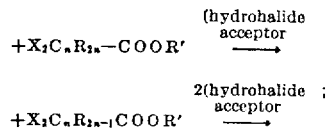

page 4, first column, line 31, for "bis(diamino" read *bis-(diamino;* and that the said Letters Patent should be read with these corrections therein that the same may conform to the record of the case in the Patent Office.

Signed and sealed this 2nd day of November, A. D. 1943.

[SEAL]

HENRY VAN ARSDALE,
*Acting Commissioner of Patents.*